Figure 1:
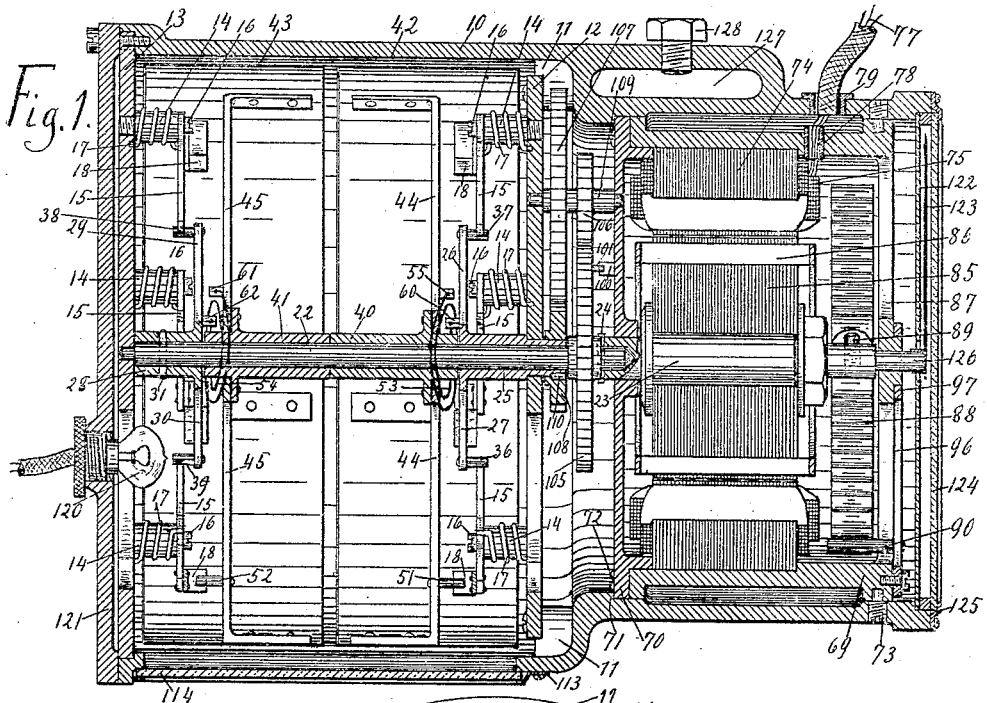

H. POTH.
SPEED INDICATOR.
APPLICATION FILED DEC. 26, 1905.

908,495.

Patented Jan. 5, 1909.

3 SHEETS—SHEET 1.

Witnesses
Inventor
Heinrich Poth
By his Attorneys

H. POTH.
SPEED INDICATOR.
APPLICATION FILED DEC. 26, 1905.
908,495.
Patented Jan. 5, 1909.
3 SHEETS—SHEET 2.
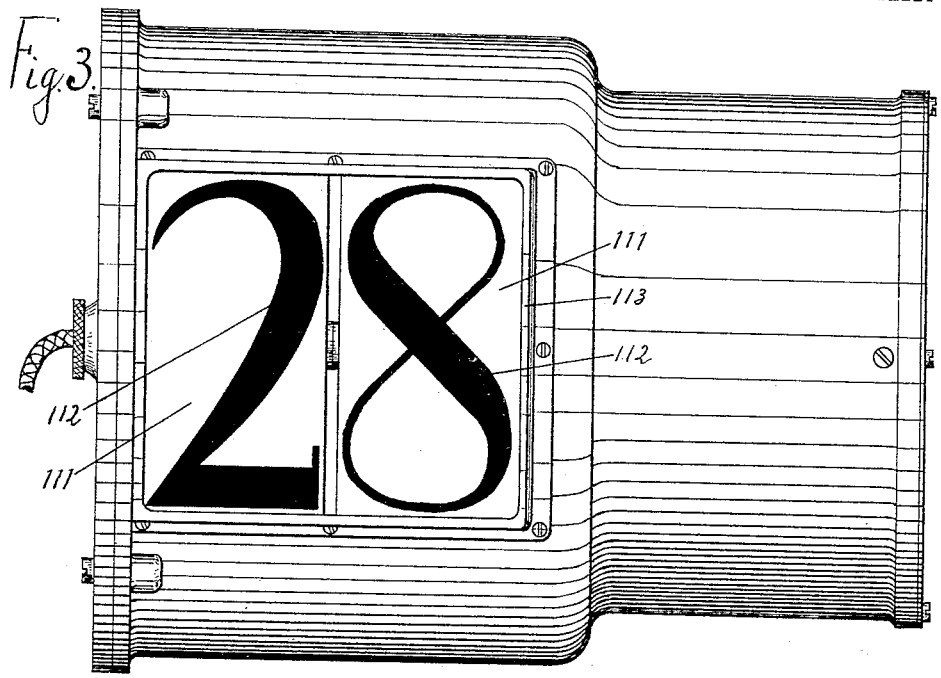
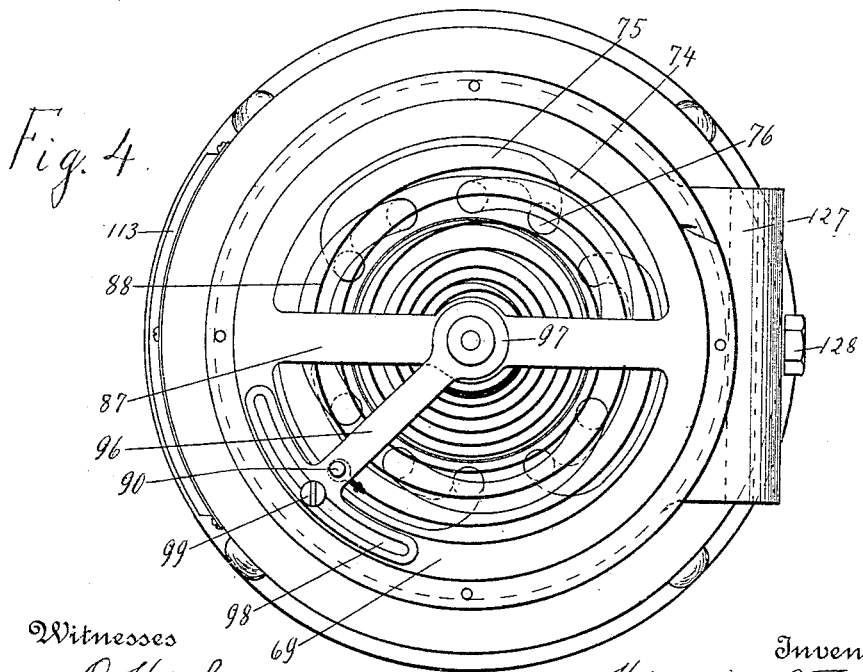

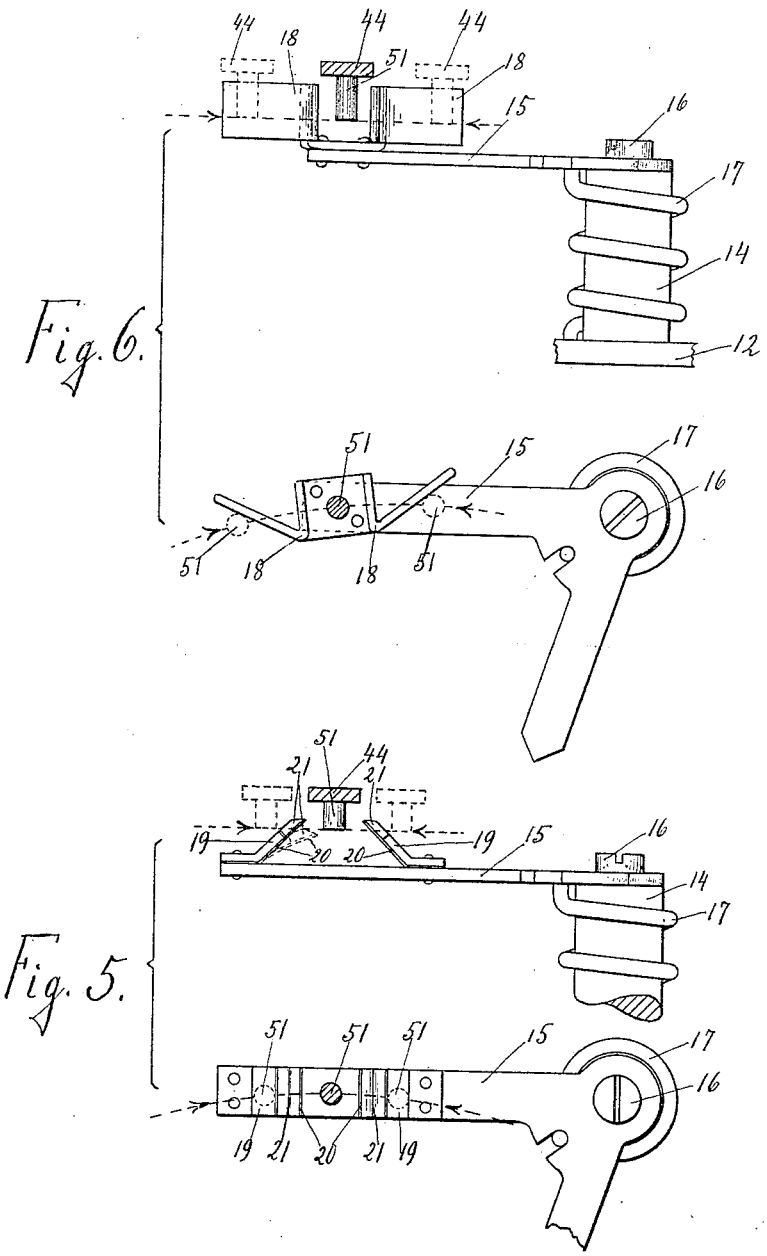

UNITED STATES PATENT OFFICE.

HEINRICH POTH, OF BROOKLYN, NEW YORK.

SPEED-INDICATOR.

No. 908,495.   Specification of Letters Patent.   Patented Jan. 5, 1909.

Application filed December 26, 1905. Serial No. 293,252.

*To all whom it may concern:*

Be it known that I, HEINRICH POTH, a subject of the German Emperor, and a resident of Brooklyn, in the county of Kings and State of New York, have invented certain new and useful Improvements in Speed-Indicators, of which the following is a specification.

My invention relates, in general, to a device operated by electricity showing the immediate speed of either stationary machinery or vehicles.

As is well known, the existing speed indicating devices, operated by electricity, have the disadvantage that the indicating dials, drums or similar means are readable only at a short distance from the apparatus owing to the small amount of power which they can have at their disposal and the consequent comparatively small indicating means.

It is the object of the present invention to so construct the speed indicating device, that the registration may be easily seen by every person at any distance according to the size of numbers on the device. Furthermore, as mechanically operated connection between the device and the moving parts of the machinery or vehicle is avoided, it can be put on any convenient place any distance from the machinery, of which the speed is to be indicated, the transmission being by the electric current only.

In particular my device can be employed for vehicles as automobiles, etc.—so that the speed of the vehicle can be seen by every person approached and passed by on the street. The electric current, which operates the device, may be generated by any kind of generator mechanically connected with the moving parts of the machinery or vehicle subjected to change of speed.

In the drawings, showing as an example a speed indicator of that kind more particularly fitted for automobiles, the power operating the device is transmitted by a small 3 phase alternating current motor, but I do not wish to limit my invention to that particular kind of motor, as any other alternating or direct current motor, or a magneto-solenoid or electromagnet may serve the same purpose.

Figure 2:
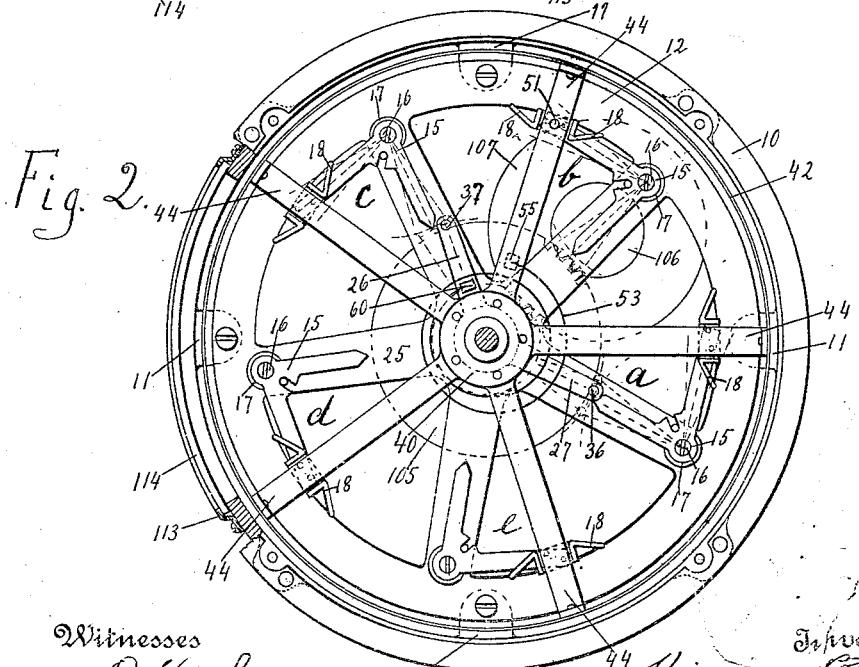

The invention in its preferred form will be described in detail with reference to the accompanying drawings, wherein:

Figure 1 is a central vertical longitudinal section of the apparatus. Fig. 2 is a view from the left side of the apparatus, the cover and one half of the registering device being removed. Fig. 3 is a view of the whole apparatus as it appears on the vehicle showing the speed in miles per hour. Fig. 4 is a side view of the apparatus after removing the right side cover. Fig. 5 is a detail view of a modification of the latches used in locking the drum. Fig. 6 is a detail view of the bell crank levers for latching the drums.

The same numbers are used for corresponding parts in the different figures.

In Fig. 1, 10 is a cylindrical casing (preferably an aluminium casting) on which are mounted on the ears 11 the supporting plate 12 and on the left end of the casing the supporting plate 13 (the latter one being removed in Fig. 2). Both plates have the form of a wheel as may be seen from the plate 12 in Fig. 2. To the spokes of each of these supporting plates are screwed in a circle five round studs 14, each one bearing at its top a bell crank 15, held in place by a screw 16 so that they can move freely around the latter ones. These bell-cranks are held in the position shown in Fig. 2 by helical springs 17 slipped over the studs 14 which will cause the bell cranks after being pulled to either side and released again, to return to their former position. The lower ends of the springs 17 are fastened in the supporting plates 12 and 13 respectively. As may be seen in Fig. 2, the ends of these bell cranks 15 are somewhat pointed on the interiorly extending arms. To the end of each of the more tangentially pointing arms is riveted a small latch 18 with two inclined wings forming cam surfaces of which each one may be secured to the arm by individual flat springs, allowing each wing to give way in one direction when touched, plainly shown in Fig. 2. A shaft 22 (preferably of steel) extends longitudinally through the center of the casing 10, having one end journaled in the center of supporting plate 13, the other end being held in place in a recess in the motor shaft 23, (to be described later) and coupled to same by the coupling pin 24. Over the shaft 22 are slipped two sleeves 25 and 28, each one having on the inward end two arms 26 and 27, and 29 and 30 respectively at a certain suitable angle to each other. Sleeve 25 can rotate freely upon shaft 22 and has its outer end protruding free through the center of the supporting plate 12. Sleeve 28 is coupled to shaft 22 by pin 31. Each of the arms 26, 27 and 29, 30 has riveted to its outer end a pin 36, 37 and 38, 39 respectively, all at such distance from shaft 22, that in revolving the sleeves 25 and 28 with their arms, said pins will strike the inward pointing arms of the bell cranks 15 mounted in their path, turning the latter far enough to let the pins pass (shown by dotted lines in Fig. 2). After the pins have passed the arms, the bell cranks will be turned back to their original positions by the helical springs 17 above mentioned. In the middle of shaft 22 between sleeves 25 and 28 are mounted two other sleeves 40 and 41 which can revolve independently of each other upon shaft 22. Riveted to each one is a drum 42 or 43 (preferably of thin sheet aluminium) by the spokes 44 and 45 respectively. One spoke of each drum carries a pin 51 or 52 respectively (Fig. 1). Pin 51 projects towards supporting plate 12, pin 52 towards supporting plate 13. Each pin is of such a length and mounted on its spoke such a distance from the center that in revolving the drum around shaft 22, the pins will strike the inclined cam wings of the latches 18 of the bell cranks 15 arranged in the path of the pin, causing the respective bell crank or the spring of the cam wing to give way until the pin has reached the top of the incline of the cam wing, whereupon the tension of spring 17 will cause the bell crank to jump back to its original position at the same time locking the pin in the space between the two cam wings of the latch 18 and thus locking the drum.

The locking of pin 51 may be accomplished in another similar way shown in Fig. 5, wherein the latch 19 is arranged in a different position on the tangential arm of bell crank 15. On the upper side of this arm are riveted the two cam wings 19 together with the leaf springs 20, each one resting against its wing. The springs are carrying on their outer ends, the head pieces 21 of the same width and thickness as the cam wings 19. It will be seen that pin 51 coming from either side will strike one of the heads 21 and cause the spring 20 to give way until the pin has passed by (shown in dotted lines) whereafter the spring will jump back to its former position, thus locking the pin 51 between the two wings. Fig. 1 shows both drums with pins 51 and 52 in latched position, the latch of each of the two bell cranks being about to operate to free the pins. Fig. 2 shows a side view of drum 42 with pin 51 locked between the two wings. Drums 42 and 43 are connected with the sleeves 25 and 28 respectively by the spiral springs 53 and 54 (Fig. 1), one end of the springs being held by the studs 55 or 61, the other end being attached to the arm 26 or 29 of the sleeve 25 or 28 by the stud 60 or 62, thus allowing a certain relative rotation between the drums and their attached sleeves.

In the right side of the cylindrical casing 10 (Fig. 1) which is of smaller diameter than the left side, is snugly fitted the cylindrical casing 69 of an ordinary 3 phase alternating current motor with the cover 70 fastened to it by screws 72 and resting against shoulder 71 of casing 10. For the purpose of my invention it is essential that the motor be capable of making at least one complete revolution and preferably several revolutions, and by the term "motor" or "electric motor" wherever used in this specification and in the claims, I refer to what is commonly known as a motor, and not an apparatus such as a magnet needle or a coil, capable of making only a fraction of one revolution in a field, as it is obvious the latter would not be suitable for apparatus such as I have designed. The motor casing 69 is secured to casing 10 by set screws 73 and contains the laminated iron body of the stator 74 (Figs. 1 and 4) bearing in its grooves 76 the field armature coils 75 (Fig. 1 in cross section, Fig. 4 in full) arranged in the well known manner, the three terminals 77 of the coils being led through casings 69 and 10 are insulated therefrom by the thimbles 78 and 79. In the middle of stator 74 is mounted a laminated rotor, the winding 86 of which is arranged in the well known cage manner its shaft 23 being journaled on one side in cover 70 and on the other side in the bridge 87 of the motor casing 69 (Fig. 1 shown in side view, Fig. 4 in end view).

Around the right end of shaft 23 near the bridge 87 is mounted a spiral spring 88 (shown in cross section in Fig. 1, in full in Fig. 4) the inner end of which is attached to the pin 89 (Fig. 1) secured to shaft 23, the outer end to the pin 90 (Figs. 1 and 4). The latter pin is secured upon an arm 96 which can move freely around the center of shaft 23 by means of its ring formed inner end 97, the outer end of the arm having an arc shaped portion with a slot 98 of suitable length in which the set screw 99 screwed to casing 69 is arranged. It will be seen, that in moving the arm 96 and securing it in the proper position by set screw 99 the spring 88 and through it, rotor 85 can be adjusted in the proper working position. Further it will be seen, that the rotor 85 is caused to revolve by the electric current against the tension of the spring 88 until the torque caused by the electric current equals the opposed torque of the spring and the rotor will come to a position of equilibrium at this point. It is well known that a dynamo or magneto-electric generator of any kind with a constant field increases its voltage and (provided a constant outside resistance) thus its current in direct proportion to the number of revolutions. It is further well known, that a properly dimensioned electro motor of any kind with a constant field supplied with such a gradually increasing current above mentioned, if not rotating, will increase its torque very nearly in direct proportion to the amperage of this current supplied and so to the number of revolutions of the generator, and as a spiral spring, such as above described, if properly dimensioned, will increase its torque in direct proportion to the revolutions made in winding it up, it will be seen that, if I divide one revolution of the rotor 85 into five equal parts, each one of these five parts of the rotor will correspond with a certain number of generator-revolutions obtained in these different positions (for instance 100; 200; 300; 400; 500 revolutions per minute). Thus it will be seen, that if I attach the motor, of my apparatus above described, to such an electric generator as above mentioned, supplying suitable current, each fifth of a revolution of the rotor 85 representing a certain torque will correspond with a certain speed of the vehicle (in miles per hour for instance) to which the generator is attached.

Returning to the description of the apparatus, 105 is a gear wheel mounted on shaft 22 and coupled to same by the coupling pin 24, which couples motor shaft 23 to shaft 22 as already described. Gear wheel 105 is in mesh with pinion 106 mounted on shaft 109 (Fig. 1) of which one end is journaled in cover 70 of the motor casing 69, and the other end in supporting plate 12. On the same shaft is mounted a gear wheel 107 which is in mesh with pinion 108 (shown in cross-section). Pinion 108 is keyed by the key 110 to the end of sleeve 25 protruding through supporting plate 12. On gear wheel 105 is fastened a pin 101 projecting toward the motor cover 70. This pin is resting against a stud 100 fastened in the cover 70, by means of which, it will be seen, gear wheel 105 with all parts coupled to it is allowed to make only one revolution and so prevent the rotor 85 from rotating further, even if an increased voltage should cause it to try to do so. The gearing of the wheels is chosen in this particular case so that gear wheel 105 coupled with the shaft of rotor 85, shaft 22 and sleeve 28 in making one revolution will cause pinion 108 with sleeve 25 to make five revolutions. As drum 42 is attached by spring 53 to sleeve 25 and drum 43 by spring 54 to sleeve 28, it will be seen, that drum 42 is making five revolutions, while drum 43 is making one. On the outside of each drum is fastened in any suitable manner a strip of white paper 111 (Fig. 3) on which numerals 112 are printed, which will be used in showing the speed of the vehicle or other machinery. These paper strips and two of the numerals can be seen plainly from the outside (as shown in Fig. 3). The numerals are protected by the glass 114 (Fig. 1 in cross-section) conforming to the cylindrical form of casing 10 and fastened to it by the frame 113.

In the sheet metal forming the periphery of the drums 42 and 43 may be punched square holes, underneath the places where the numerals on the paper strip will come and of such a size that the electric incandescent lamp 120 mounted in the cover 121 of casing 10, which illuminates the hollow space inside of the two drums 42 and 43 may illuminate the numerals on the white paper strips from the inside through the square holes in the sheet metal so that they can be read at night from the outside of the apparatus. As the driver of the vehicle himself will be unable to read the numbers indicating the speed, the glass window being located on the outside of the apparatus when the latter one is mounted on the vehicle an extra dial 122 is provided on the motor bearing end of casing 10, in a suitable manner and suitably graduated. A hand or pointer 123 mounted on the pin 126 of the motor shaft 23 protruding through the center of dial 122 will show to the operator the speed maintained by the vehicle at the time. A round pane of glass 124 protecting the dial is held in place by frame 125 screwed upon casing 10. On the outside of casing 10 opposite the glass window 114 an oval recessed hanger 127 (Figs. 1 and 4) is provided by means of which the apparatus may be hung upon a suitable bracket on the vehicle and will be held in place by set screw 128 (Figs. 1 and 4) running through the wall of hanger 127.

The apparatus above described is designed especially for automobiles and indicates a speed up to 48 miles per hour at intervals of two miles. The drum 43 having on its periphery the white paper strip with the numerals for the "tens" is as described before in connection with sleeve 28 and so with shaft 22 making as a maximum only one revolution by means above described. The numerals on its periphery five in all, are 0; 1; 2; 3; 4. Drum 42 having on its periphery the numerals for units is as described before in connection with sleeve 25 and pinion 108 making five revolutions as a maximum. The numerals on its paper strip five in all are 0; 2; 4; 6; 8. Thus it will be seen that for instance beginning from 0 on both drums after one revolution of the units drum 42 showing in succession numbers 0—8—0, drum 43 will have revolved only $\frac{1}{5}$ and show its numeral 1 which on its place combined with the 0 of the units drum 42 shows the number "10" on the outside of the apparatus. Thus continuing the apparatus will show all the even numbers from 0 up to 48.

It will be noticed that the drum in revolving would not only show through the glass 114 the full figures of the numerals—but naturally, in passing during their rotation through intermediate positions show for instance the last half of one numeral and the first half of the following one. As this would make the reading or the numbers very uncertain the device, the elements of which were described in the beginning, has been designed and is shown in Figs. 1 and 2 by means of which a step by step rotation of the drum can be obtained, said steps being so dimensioned that the drums after each step being locked show the full figure of the numerals through the glass, whereby the drums are released and enabled to take the next step only, after the full amount of speed corresponding with the succeeding number has been reached. The way in which this is accomplished will now be described: Referring to Fig. 2 the five bell cranks 15 mounted on supporting plate 12 and described in the beginning may be distinguished as $a$, $b$, $c$, $d$, and $e$. Fig. 2 shows the spoke 44 of drum 42 above $b$ with the pin 51 locked between the wings 18 of bell crank $b$. The arms 26 and 27 carried by sleeve 25 (shown in Fig. 2 by a dotted circle) have their respective positions by bell cranks $c$ and $a$ which are in such positions relatively to drum 42 that the spiral spring 53 connecting these arms 26 and 27 with drum 42 is without any tension. If sleeve 25 with its arms 26 and 27 is rotating counter clockwise in Fig. 2, it will be seen, that arm 27 with its pin 36 is approaching the inner arm of bell crank $b$. At the same time spring 53 will get a tension and tend to move drum 42 in the same direction, which it is prevented from doing by the pin 51 locked between the two wings of bell crank $b$. As soon as arm 27 touches the inward arm of bell crank $b$ with its pin 36 and continues rotating, it will rock this bell crank (as shown in dotted lines) until the arm 27 with its pin 36 has passed. This rocking of bell crank $b$ will cause its wing-latch 18 to release pin 51 of drum 42, so that now the tension of spring 53 comes into effect, revolving drum 42 in the same direction as sleeve 25 rotates, with a certain impulse, and throwing drum 42 with its pin 51 until the said pin runs up into the latch $c$ and is held. Pin 51 in touching the inclined cam wing of the latch on bell crank $c$ will cause bell crank $c$ to give way until the pin has passed the incline of the wing when the bell crank will be thrown back by means of its helical spring 17 slipped over the stud as described in the beginning, at the same time locking pin 51 between its two latch wings. Arm 27 will now be by bell crank $b$, arm 26 by bell crank $d$, and spring 53 will be again free from tension. If arm 27 still continuing rotating now approaches bell crank $c$ the operation above described will be repeated and drum 42 will be thrown around until locked by the latch on bell crank $d$. In going back to the first position, where pin 51 is locked in $b$, it will be seen that a similar operation takes place when the sleeve 25 with its arm 26 and 27 is rotating in the opposite direction, (from $c$ to $b$ to $a$). Then arm 26 comes into effect. If the latter one approaches bell crank $b$ its pin 39 will strike the inward arm of said bell crank and thus unlock pin 51 in the same way as above described. Spring 53 having gotten now a tension in direction from $c$ to $b$ to $a$, will throw drum 42 into the position where pin 51 will be locked by bell crank $a$ in the same way as shown. Thus it will be seen the drum can be revolved in either direction, the gradual rotation of the motor, its gear and sleeves 25 and 28 being transformed by the above described device into a step by step rotation. In this particular case I have selected five for the number of bell cranks, as the number of bell cranks must be the same as the number of numerals on the drum so as to have one step for each numeral. Any other suitable number of steps and numerals may be chosen to serve the purpose of the apparatus, so that the latter one can be adapted for any maximum speed, indicating any desired number of speeds between 0 and the maximum.

Assumed that the device be applied to a motor vehicle and that current be supplied to the device in the manner described above with its intensity varying proportionately with the vehicle speed, the operation of the device is shortly as follows:—When the vehicle is at rest the units and tens drums each show the figure 0. In starting, the vehicle will cause current to be supplied to the motor, whereupon its armature will tend to revolve and to operate drums 42 and 43, step by step, in the manner described above. Assumed now that the vehicle's speed continues increasing, the counteracting torque of spring 88 will always be overcome by the armature torque, and the latter continue to revolve and to advance drums 42 and 43 step by step, which in turn will show to the observer the increase in speed (for instance, in miles per hour) in steps of two miles each, as described. After attaining a certain speed of, for instance, twenty-eight miles per hour, the vehicle may maintain this speed for some time. The intensity of the current supply to the motor thus not further increasing the torque of the armature, will not be able to further overcome the spring torque, and thus both torques balancing each other, the armature will remain at rest. Owing to the proper dimensioning and adjusting of the spring, the armature has, during its motion into this angular position, advanced the tens drum two steps so as to present the numeral 2: and in turn the units drum, through suitable gearing described, has been revolved step by step twice one whole revolution so as to present figure 8 to the observer, so that altogether the figure 28 will appear to him and remain visible so long as the vehicle maintains this speed. Upon further increasing the vehicle's speed, the increasing of current intensity will cause an increasing in armature torque and cause further motion of the armature against the spring torque to a point at which again spring torque and armature torque balance each other, and the armature will cause thereby the drums to indicate the speed then maintained by the vehicle. Upon reducing the speed, the reverse will take place. The current intensity,—and thus the armature torque,—will decrease and the over-balancing spring torque will revolve the armature in the opposite direction, which in turn will revolve the drums in the opposite direction step by step by the means above described, until at the standstill of the vehicle the drums will both again indicate zero.

While I have described the use of a generator operated by the moving parts of the machine or vehicle as the means for supplying to the motor an electric current having a voltage or tension proportional to the speed of the said moving parts, I do not wish to limit the scope of my invention to this manner of obtaining such a current.

Without departing from the spirit of my invention one might employ for instance a source of constant current independent of the moving parts of the machine or vehicle but having either its voltage or current regulated by some special apparatus under control of the said moving parts and supplying current to a suitable motor.

Having thus described my invention what I claim as new therein and desire to secure by Letters Patent is:

1. In a device for indicating the speed of mechanism, the combination with the indicating means, an electric motor having its rotor operatively connected with said indicating means, latches holding said indicating means and adapted to release the same in a step by step manner, and means opposing said motor; of means for supplying electric current to said motor for overcoming the opposition of said means.

2. In a device for indicating the speed of mechanism, the combination with an indicator drum, an electric motor having its rotor operatively connected with said indicator drum, latches holding said indicator drum and adapted to release the same in a step by step manner, and means opposing said motor; of means for supplying electric current to said motor to overcome the opposition of said means.

3. In a device for indicating the speed of mechanism, the combination with a casing having a sight opening, a drum rotatably mounted therein with numerals adapted to be seen through said sight opening, an electric motor having its rotor operatively connected with said drum, latches holding said drum against rotation and releasing the same in a step by step manner, and means opposing said motor; of means for supplying electric current to said motor to overcome the opposition of said means.

4. In a device for indicating the speed of mechanism, the combination with the indicating means, an electric motor having its rotor operatively connected with said indicating means, latches holding said indicating means and adapted to release the same in a step by step manner, and a spring opposing said motor; of means for supplying electric current to said motor for overcoming the opposition of said spring.

5. In a device for indicating the speed of mechanism, the combination with an indicator drum, an electric motor having its rotor operatively connected with said indicator drum, latches holding said indicator drum and adapted to release the same in a step by step manner, and a spring opposing said motor; of means for supplying electric current to said motor to overcome the opposition of said spring.

6. In a device for indicating the speed of mechanism, the combination with a casing having a sight opening, a drum rotatably mounted therein with numerals adapted to be seen through said sight opening, an electric motor having its rotor operatively connected with said drum, latches holding said drum against rotation and releasing the same in a step by step manner, and a spring opposing said motor; of means for supplying electric current to said motor to overcome the opposition of said spring.

7. In a device for indicating the speed of mechanism, the combination with a casing having a sight opening, a pair of drums rotatably mounted therein and bearing the units and tens numerals respectively which are adapted to be seen through said sight opening, an electric motor for rotating said drums, latches holding said drums against rotation and adapted to release the same in a step by step manner, and a spring opposing said motor; of means for supplying electric current to said motor to overcome the opposition of said spring.

8. In an indicator apparatus, the combination with a movable indicator drum, and means for actuating the same; of bell crank levers mounted on a stationary part of the apparatus and having latches adapted to lock the indicator drum, and means for rocking said bell crank levers to release said drum in a step by step manner.

9. In an indicator apparatus, the combination with an indicator drum, and means for actuating the same; of spring returned bell crank levers mounted on a stationary part of the apparatus and having latches adapted to lock said drum, and means for rocking said spring returned levers to release said drum in a step by step manner.

10. In an indicator apparatus, the combination with a movable indicator drum; of bell crank levers mounted on a stationary part of the apparatus and having latches adapted to lock said drum, and means tending to actuate said drum and rocking said bell crank levers to release the drum in a step by step manner.

11. In an indicator apparatus, the combination with a movable drum; of spring returned bell crank levers mounted on a stationary part of the apparatus and having latches adapted to lock said movable drums, and means tending to actuate said drum and rocking said spring returned levers to release the drum in a step by step manner.

12. In an indicator apparatus, the combination with a rotatable indicator drum, and bell crank levers mounted on a stationary part of the apparatus and having latches adapted to lock said rotatable drum; of a rotatable member having spring connection with said rotatable drum and provided with means for rocking said bell crank levers to release said drum in a step by step manner.

13. In an indicator apparatus, the combination with a rotatable indicator drum, and spring returned bell crank levers mounted on a stationary part of the apparatus and having latches adapted to lock said rotatable drum; of a rotatable member having spring connection with said rotatable drum and provided with means for rocking said spring returned bell crank levers to release said rotatable drum in a step by step manner.

14. In an indicator apparatus, the combination with an indicator drum, a latch pin mounted thereon, and bell crank levers having latches upon one arm for receiving the latch pin on said drum; of means tending to rotate said drum and engaging the other arm of said bell crank levers to rock the lever and release said latch pin in a step by step manner.

15. In an indicator apparatus, the combination with a rotatable indicator drum, spring returned bell crank levers having latches on one arm, and a latch pin on said rotatable drum adapted to rock the spring returned bell crank levers and engage in said latches on said levers; of a rotatable member having spring connection with said rotatable indicator drum and provided with means for rocking said spring returned bell crank levers to release the drum in a step by step manner.

16. In an indicator apparatus, the combination with the casing, a shaft journaled therein, an indicator drum rotatable on said shaft, and bell crank levers mounted on a stationary part of the apparatus and successively locking said drum; of a sleeve rotatable on said shaft having spring connection with said drum and provided with an arm for rocking said bell crank levers successively to release the drum in a step by step manner, and means for rotating said sleeve.

17. In an indicator apparatus, the combination with the casing, a shaft journaled therein, an indicator drum rotatable on said shaft, and bell crank levers mounted on a stationary part of the apparatus and successively locking said drum; of a sleeve rotatable on said shaft having spring connection with said drum and provided with an arm for rocking said bell crank levers successively to release the drum in a step by step manner, and an electric motor for rotating said sleeve.

18. In an indicator apparatus, the combination with the casing, a shaft journaled therein, an indicator drum rotatable on said shaft, and bell crank levers mounted on a stationary part of the apparatus and successively locking said drum; of a sleeve fixed on said shaft having spring connection with said drum and provided with an arm for rocking said bell crank levers successively to release the drum in a step by step manner, and means for rotating said shaft.

19. In an indicator apparatus, the combination with the casing, a shaft journaled therein, an indicator drum rotatable on said shaft, and bell crank levers mounted on a stationary part of the apparatus and successively locking said drum; of a sleeve fixed on said shaft having spring connection with said drum and provided with an arm for rocking said bell crank levers successively to release the drum in a step by step manner, and an electric motor for rotating said shaft.

20. In an indicator apparatus, the combination with a shaft, an indicator drum rotatable thereon and spring returned bell crank levers successively locking said drum; of a sleeve rotatably mounted on said shaft having spring connection with said rotatable drum and provided with an arm adapted to rock said spring returned levers successively to release said drum in a step by step manner, and means for rotating said sleeve.

21. In an indicator apparatus, the combination with a shaft, a pair of indicator drums independently rotatable thereon, and spring returned bell crank levers successively locking said drums; of a sleeve fixed on said shaft, and a sleeve rotatable on said shaft each having spring connection with an indicator drum and provided with an arm adapted to rock said spring returned levers successively to release the drums in a step by step manner, means for rotating said shaft, and a multiplying connection between said rotating means and the rotatable sleeve.

22. In an indicator device, the combination with a shaft, an indicator drum rotatable thereon, and spring returned bell crank levers successively locking said drum; of a sleeve fixed on said shaft having spring connection with said rotatable drum and provided with an arm adapted to rock said spring returned bell crank levers successively to release said drum in a step by step manner, and means for rotating said shaft.

23. In an indicator device, the combination with a shaft, an indicator drum rotatable thereon, and spring returned bell crank levers successively locking said drum; of a sleeve fixed on said shaft having spring connection with said rotatable drum and provided with an arm adapted to rock said spring returned bell crank levers successively to release said drum in a step by step manner, and an electric motor for rotating said shaft.

24. In an indicator apparatus, the combination with a shaft, an indicator drum rotatable thereon, and spring returned bell crank levers successively locking said drum; of a sleeve rotatable on said shaft having spring connection with said rotatable drum and provided with an arm adapted to rock said spring returned levers successively to release said drum in a step by step manner, and an electric motor for rotating said sleeve.

25. In an indicator apparatus, the combination with a shaft, a pair of indicator drums independently rotatable thereon, and spring returned bell crank levers successively locking said drums; of a sleeve fixed on said shaft and a sleeve rotatable on said shaft each having spring connection with an indicator drum and provided with an arm adapted to rock said spring returned levers successively to release the drums in a step by step manner, an electric motor for rotating said shaft, and a multiplying connection between said electric motor and said rotatable sleeve, and means opposing the torque of said motor.

26. In an indicator device, the combination with the indicator means, and a latch pin thereon; of a bell crank lever provided with a latch device on one of its arms having a surface movable relatively to said lever.

27. In an indicator device, the combination with the indicator means and a latch pin thereon; of a bell crank lever provided with an inwardly yielding latch device.

28. In an indicator device, the combination with an indicator drum and a latch pin thereon; of a spring returned bell crank lever having an inwardly yielding latch device on one of its arms.

29. In an indicator device, the combination with an indicator drum and a latch pin thereon; of a spring returned bell crank lever provided with a pair of inwardly yielding latch plates adapted to receive and hold the said latch pin between them, and means tending to rotate said drum and rocking said lever to release said drum from said pair of latch plates.

HEINRICH POTH. [L. S.]

Witnesses:
H. ALFRED JANKE,
HENRY ENDERS.